United States Patent [19]
Walker

[11] Patent Number: 5,350,021
[45] Date of Patent: Sep. 27, 1994

[54] CREVICE CLEANING IMPLEMENT FOR PAVEMENT AND THE LIKE

[76] Inventor: Stafford B. Walker, 10057 Avenida Magnifica, San Diego, Calif. 92131

[21] Appl. No.: 43,942

[22] Filed: Apr. 5, 1993

[51] Int. Cl.⁵ ............................................. A01D 34/84
[52] U.S. Cl. ...................... 172/13; 172/377; 172/371
[58] Field of Search ................ 172/18, 19, 13, 27, 172/371, 375, 376, 377; 171/5; 30/172, 287, 294; 56/400.05–400.07; 15/236.06

[56] References Cited

U.S. PATENT DOCUMENTS

| D. 253,806 | 1/1980 | Cox . | |
|---|---|---|---|
| D. 300,714 | 4/1989 | Skibell . | |
| 1,018,073 | 2/1912 | Nelson | 172/13 |
| 1,060,445 | 4/1913 | Fields | 172/13 |
| 1,082,570 | 12/1913 | Underwood | 172/13 |
| 1,531,156 | 3/1925 | Thissen | 172/13 |
| 1,633,318 | 6/1927 | Drish | 172/377 |
| 2,625,871 | 1/1953 | Miller | 172/377 |
| 2,787,057 | 4/1957 | Bell | 172/13 |
| 3,058,530 | 10/1962 | Keinath | 172/13 |
| 3,065,801 | 11/1962 | Wood | 172/13 |
| 4,557,335 | 12/1985 | Handy . | |
| 4,611,666 | 9/1986 | Albertson . | |
| 4,832,132 | 5/1989 | Barcelon . | |

FOREIGN PATENT DOCUMENTS

| 161326 | 2/1955 | Australia | 172/375 |
|---|---|---|---|
| 2178286 | 2/1987 | United Kingdom | 172/13 |

*Primary Examiner*—Randolph A. Reese
*Assistant Examiner*—Spencer Warnick
*Attorney, Agent, or Firm*—Rhodes & Ascolillo

[57] ABSTRACT

An implement for cleaning spaces between adjacent slabs of paving materials, the implement including a pilot member proportioned to fit into the spaces between the adjacent slabs of paving materials, a pair of flange members forming a V-shape having an apex, the pilot member and the pair of flange members being joined such that the pilot member extends away from the exterior of the apex of the V-shape, a handle that extends away from the interior of the apex of the V-shape, and a pivot apparatus for providing a pivoting movement between the pair of flange members and the pilot member and the handle.

6 Claims, 3 Drawing Sheets

5,350,021

CREVICE CLEANING IMPLEMENT FOR PAVEMENT AND THE LIKE

BACKGROUND

1. Field of the Invention

The present invention relates to an implement that is designed to clean out grass and other vegetation that grows in the spaces between concrete slabs of sidewalks, driveways, etc.

There are currently no tools specifically designed for this task., and as a result, it requires a great deal of stooping, bending, and working with inappropriate existing tools, usually with unsatisfactory results and often a great deal of discomfort.

2. Description of the Related Art

U.S. Pat. No. 4,611,666 relates to a crack and crevice weeder device that has a cutting head attached to the end of a U-shaped rod which is, in turn, attached to a handle. Optionally, a separate narrower scraping device may also be attached to a median portion of the U-shaped rod in order to allow access to cracks and crevices that are too narrow for the cutting head. Use of the narrower scraping device requires inverting the tool.

U.S. Pat. No. 4,832,132 relates to a hand weeder tool having a forked weed engaging portion and a serrated prong centered thereon for entangling the root portion of a weed. This device appears to be designed for uprooting weeds located on an expanse of open ground.

U.S. Pat. No. 4,557,335 relates to a wing section rod weeder designed for attachment to a tractor.

U.S. Design Pat. Nos. 253,806 and 300,714 disclose designs for manually operated weeding tools.

SUMMARY OF THE INVENTION

In one aspect, the invention features an implement for removing debris from crevices in concrete pavement, the implement including: a tool, the tool including a downwardly projecting pilot member, the pilot member being proportioned and configured to fit in the crevices and to thereby pilot the tool along the crevices and at least one cutting edge extending transversely with respect to the pilot member; and a handle extending away from the tool.

In preferred embodiments, the at least one cutting edge includes at least two cutting edges extending in opposite transverse directions with respect to the pilot member; the tool additionally includes a pair of flange members extending in opposite transverse directions with respect to the pilot member, and one each of the at least two cutting edges is provided upon one each of the pair of flange members; each of the cutting edges and each of the flange members extends obliquely with respect to the pilot member; the pair of flange members are disposed in an elongated V-shape, with the pilot member extending outward from the apex of the elongated V-shape; each of the flange members has a slanted leading face, each of the slanted leading faces of the flange members forming an acute angle with the apex of the elongated V-shape; one each of the slanted leading faces of the flange members has one each of the at least two cutting edges formed thereon; each of the flange members is in the shape of a trapezoid having a first pair of substantially parallel sides and a second pair of substantially nonparallel sides, one each of the substantially nonparallel sides of each of the flange members being one each of the slanted leading faces and having one each of the at least two cutting edges formed thereon; the at least two cutting edges includes at least four cutting edges, two each of the at least four cutting edges being formed at the corners of each of the slanted leading faces of the flange members; each of the cutting edges is a self-sharpening cutting edge; the implement additionally includes a pivot apparatus for providing a pivoting movement, within the plane of the pilot member, between the tool and the handle; the pivot apparatus includes: a pivot member extending substantially inward from the apex of the elongated V-shape, the pivot member being disposed substantially in the same plane as the pilot member, the pivot member having a pivot hole provided therein; a pair of outstanding flanges provided on the handle, the outstanding flanges being spaced from one another by a slot, the slot being proportioned to accept the insertion of the pivot member therein; each of the outstanding flanges on the handle also being provided with a pivot hole; the pivot holes in the outstanding flanges on the handle being disposed so as to align with one another and with the pivot hole in the pivot member when the pivot member is inserted into the slot; and a bolt and nut apparatus for extending through each of the pivot holes; the handle includes a wooden handle; and the pivot apparatus additionally includes a threaded connection between the pair of outstanding flanges and the handle, and a pair of washers.

In another aspect, the invention features an implement for cleaning spaces between adjacent slabs of paving materials, the implement including: a substantially planar pilot member proportioned to fit into the spaces between the adjacent slabs of paving materials; a pair of flange members forming a V-shape having an apex; the pilot member and the pair of flange members being joined such that the pilot member extends away from the exterior of the apex of the V-shape; a handle that extends away from the interior of the apex of the V-shape: and a pivot apparatus for providing a pivoting movement between the pair of flange members and the pilot member and the handle.

In preferred embodiments, each of the flange members has a sloping leading face having at least one cutting edge provided thereon; each of the sloping leading faces of the flange members has two corner edges, each of the two corner edges having a cutting edge formed thereon; and each of the cutting edges is self-sharpening.

In a still further aspect, the invention features an implement for removing debris from spaces in pavement, the implement including: a tool head, the tool head including: at least two flange members; each of the flange members being of trapezoidal shape and having a top side, a bottom side, and a pair of substantially nonparallel lateral sides; the at least two flange members being attached to one another along the bottom sides to form an elongated V-shape having an apex; a pilot member proportioned to be inserted into the spaces, the pilot member having an upper edge; the upper edge of the pilot member being attached to the apex of the elongated V-shape and the pilot member extending downward therefrom; one of the substantially nonparallel sides of each of the flange members being slanted to thereby form an acute angle with the bottom sides of the flange members; a cutting edge formed on each of the slanted sides; each of the cutting edges being substantially serf-sharpening; a pivot member attached to the apex of the elongated V-shape and extending upward therefrom; the pivot member being disposed substantially in the same plane as the pilot member; the pivot member having a pivot hole therethrough; the implement additionally including a handle, the handle including: an elongated handle member; a pivot fitting; the pivot fitting having a bifurcated end with two outstanding tines and a space disposed therebetween; the space being proportioned to accept and accommodate the pivot member; each of the outstanding tines being provided with a hole therethrough; a detachable threaded connection between the handle member and the pivot fitting; a threaded bolt for passing through the hole in the pivot member and each of the holes in the outstanding tines; a wing nut for threading onto the bolt; and at least two washers.

Preferably, the handle member is wood.

One object of the present invention is the provision of a crevice cleaning implement that allows the quick and effective removal of weeds and other vegetation growing in the crevices of pavement.

Another object of the invention is the provision of such an implement that permits the removal of the vegetation with a minimum of bending and/or stooping.

A further object is the provision of such an implement that is relatively simple in construction and therefore inexpensive, and that can also be easily cleaned.

The invention will now be described by way of a particularly preferred embodiment, reference being made to the accompanying drawings, wherein:

DESCRIPTION OF THE PREFERRED EMBODIMENT

Figure 1:
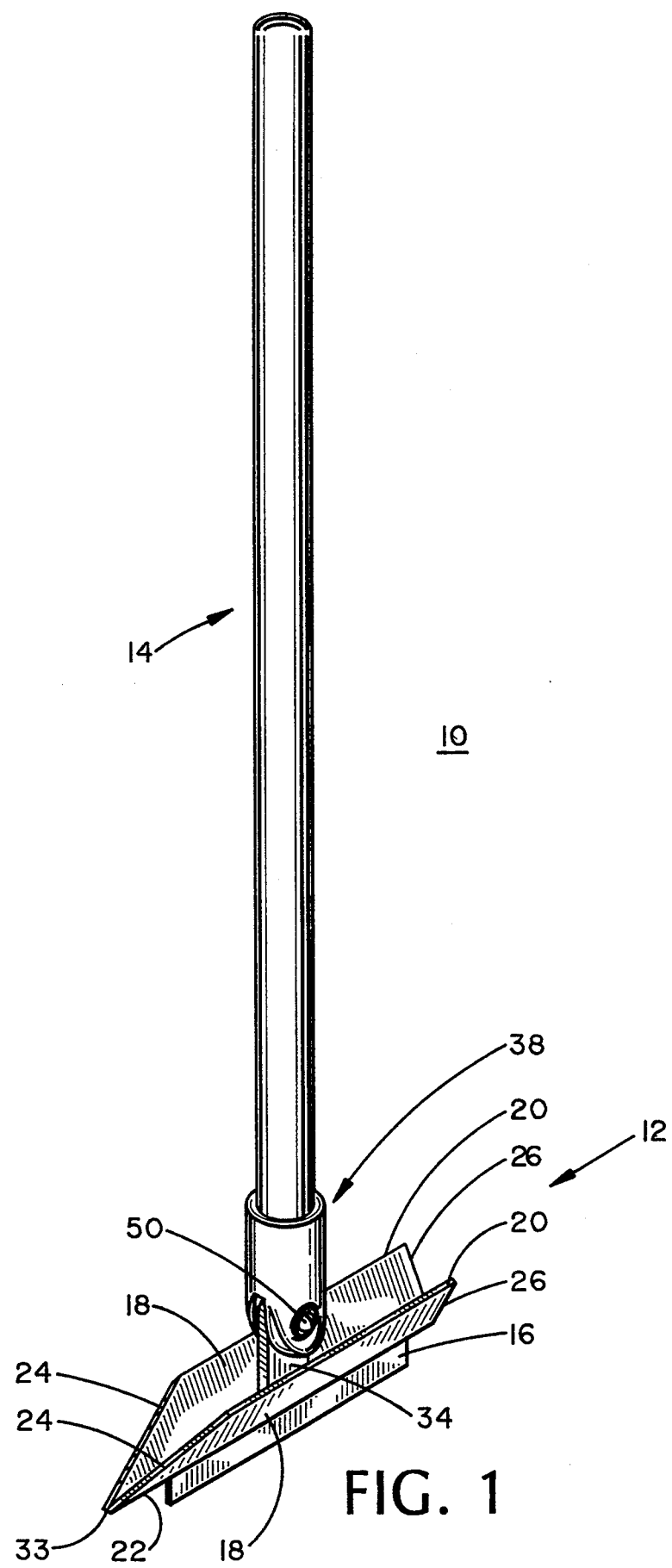
FIG. 1 is a perspective view of a crevice cleaning implement constructed according to the invention.
Figure 2:
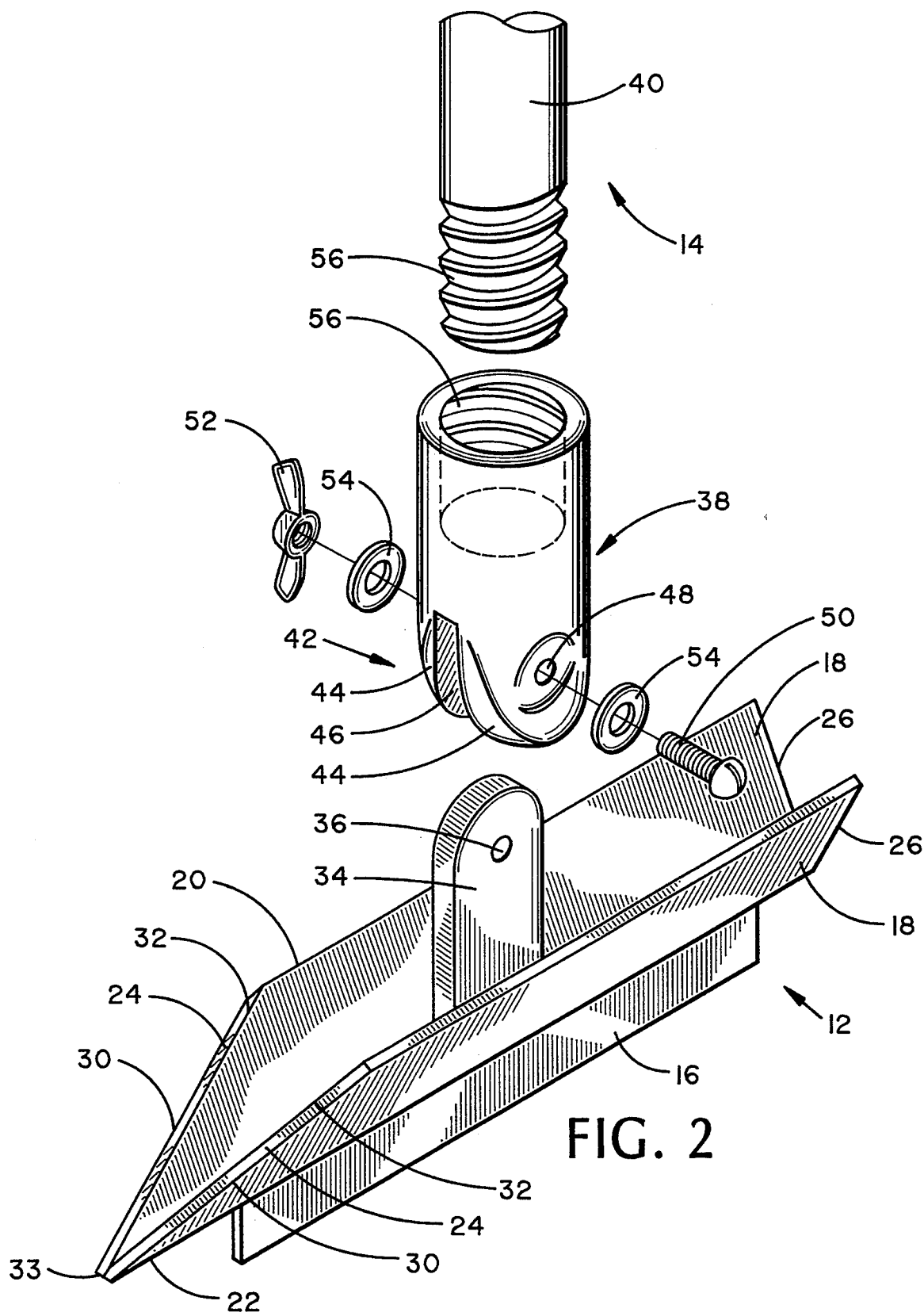
FIG. 2 is partial exploded perspective view of the crevice cleaning implement of FIG. 1, showing a pivoting connection between a handle and a tool head thereof in more detail.
Figure 3:
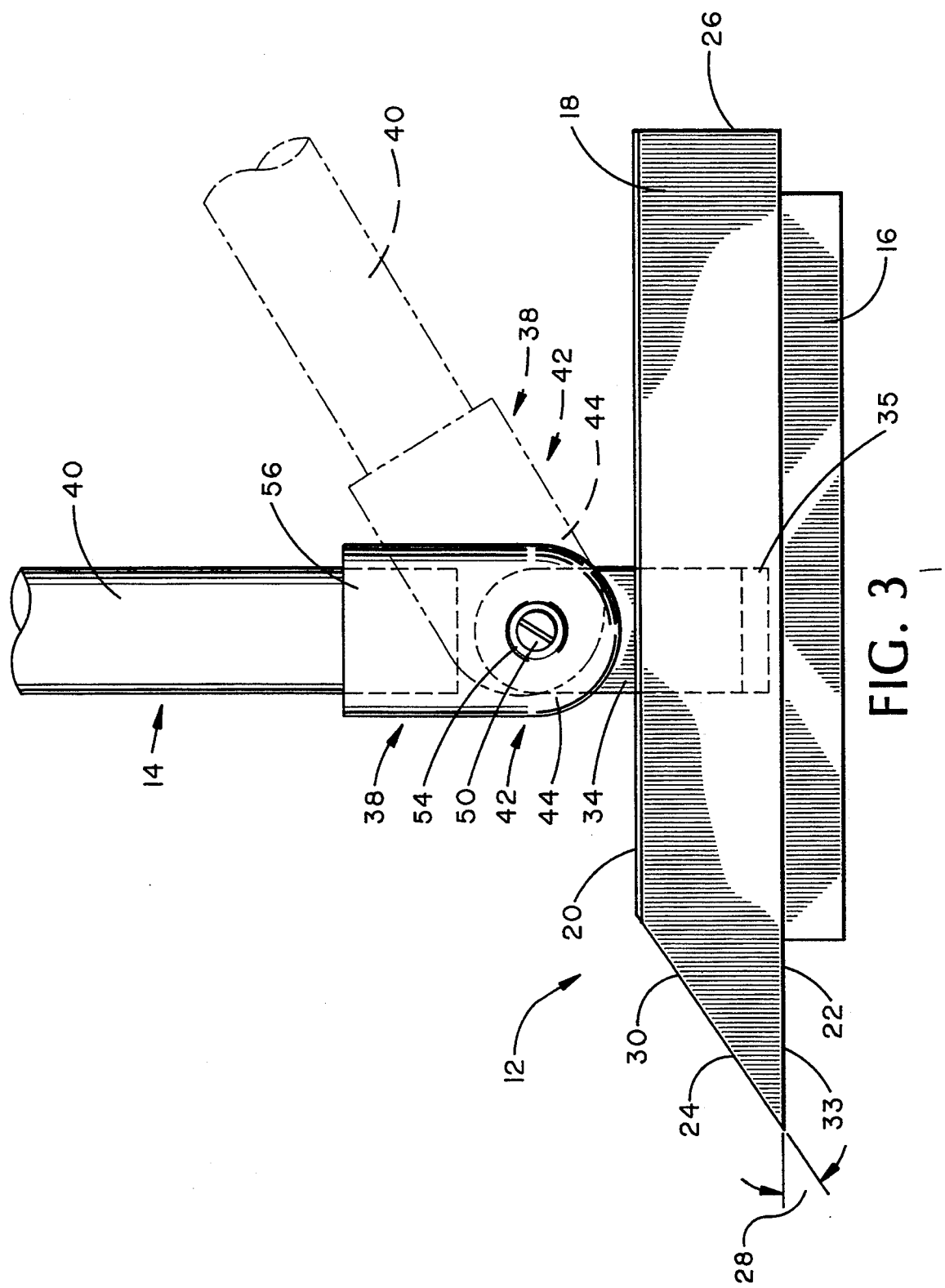
FIG. 3 is a partial side elevation of the crevice cleaning implement, showing, in phantom, a pivoting action made possible by the pivoting connection shown in detail in FIG. 2.

Referring now to all of FIGS. 1-3, but most particularly to FIGS. 1 and 2, a crevice cleaning implement 10 constructed according to the invention generally includes a tool head 12 and a handle 14. The tool head 12 is generally constructed of a flat (or planar) pilot member 16 of a generally rectangular shape that extends downward from the implement 10 and a pair of flange members 18 that are joined to form an elongated V-shape. Each of the flange members 18 is trapezoidal in shape and has a top side 20, a bottom side 22, and lateral sides 24 and 26. The top and bottom sides 20 and 22 are substantially parallel to one another, while the lateral sides 24 and 26 are substantially nonparallel.

One lateral side 24 of each of the flange members 18 is slanted (or oblique) with respect to the bottom side 22 of the flange member 18 and forms an acute angle 28 with respect thereto, as shown most clearly in FIG. 3. Each of the slanted (or oblique) lateral sides 24 has at least one cutting edge 30 formed on an outside corner thereof, and preferably cutting edges 30 and 32 are formed on both the outside and inside corners, respectively, of each slanted lateral side 24. Preferably, the flange members 18 and the cutting edges 30 and 32 are constructed such that the cutting edges 30 and 32 are self-sharpening. That is, for example, the material used for the flange members 18 and the construction of the cutting edges 30 and 32 thereon is such that the cutting edges 30 and 32 will be sharpened through use, e.g., by their contact with the pavement and/or debris such as dirt, stones, etc. In this regard, the flange members 18 are preferably formed of a high carbon steel.

The two flange members 18 are preferably welded together along their bottom sides 22 to form the elongated V-shape discussed above, and the pilot member 16 is preferably welded to an apex 33 of the elongated V-shape such that it extends outward therefrom.

The tool head 12 also includes a pivot member 34 that lies in the same plane as the pilot member 16 and extends inward from the apex 33 of the elongated V-shape. Preferably, the pivot member 34 is welded to the apex 33 of the elongated V-shape in this position. The pivot member 34 may preferably be provided with a pair of beveled surfaces 35, shown most clearly in FIG. 3, in order to facilitate the attachment (e.g., by welding) of the pivot member 34 to the interior surfaces of the apex 33 of the elongated V-shape. The pivot member 34 is provided with a hole 36 that cooperates with a pivot fitting 38 provided on the handle 14 to allow a planar pivoting movement between the handle 14 and the tool head 12, as seen in FIG. 3 and as described more fully below.

The handle 14 generally includes the pivot fitting 38 and a handle 40. The pivot fitting 38 has a bifurcated end 42 with two outstanding tines (or flanges) 44 that define a slot 46 therebetween, each of the tines 44 being provided with a hole 48. The slot 46 is proportioned to accept and accommodate the pivot member 34 of the tool head 12. With the pivot member 34 positioned in the slot 46, a bolt 50 is passed through the aligned holes 36 and 48. A wing nut 52 secures the bolt 50, and a pair of washers 54 are positioned on the bolt 50 on opposite sides of the pivot fitting 38 to complete the assembly.

A threaded connection 56 is provided between the handle member 40 and the pivot fitting 38. Preferably, the handle member 40 is constructed of wood. However, the handle member 40 may also be constructed of aluminum or the like. Additionally, in the case where the handle member 40 is constructed of aluminum, a telescoping handle member 40 has been considered as an additional feature of the invention, and is intended to fall within the scope of the appended claims.

While the invention has been herein described by way of a particular preferred embodiment, various substitutions of equivalents may be effected without departing from the spirit and scope of the invention as set forth in the following claims.

What is claimed is:

1. An implement for cleaning spaces between adjacent slabs of paving materials, said implement comprising:

a substantially planar pilot member proportioned to fit into the spaces between the adjacent slabs of paving materials;

a pair of flange members forming a V-shape having an apex;

said pilot member and said pair of flange members being joined such that said pilot member extends away from the exterior of said apex of said V-shape;

a handle that extends away from the interior of said apex of said V-shape: and pivot means for providing a pivoting movement between:
said pair of flange members and said pilot member; and
said handle.

2. An implement according to claim 1, wherein each of said flange members has a sloping leading face having at least one cutting edge provided thereon.

3. An implement according to claim 2, wherein each of said sloping leading faces of said flange members has two corner edges, each of said two corner edges having a cutting edge formed thereon.

4. An implement according to claim 3, wherein each of said cutting edges is self-sharpening.

5. An implement for removing debris from spaces in pavement, said implement comprising:
a tool head, said tool head comprising:
at least two flange members;
each of said flange members being of trapezoidal shape and having a top side, a bottom side, and a pair of substantially nonparallel lateral sides;
said at least two flange members being attached to one another along said bottom sides to form an elongated V-shape having an apex;
a pilot member proportioned to be inserted into the spaces, said pilot member having an upper edge;
said upper edge of said pilot member being attached to said apex of said elongated V-shape and said pilot member extending downward therefrom;
one of said substantially nonparallel sides of each of said flange members being slanted to thereby form an acute angle with said bottom sides of said flange members;
a cutting edge formed on each of said slanted sides;
each of said cutting edges being substantially self-sharpening;
a pivot member attached to said apex of said elongated V-shape and extending upward therefrom;
said pivot member being disposed substantially in the same plane as said pilot member;
said pivot member having a pivot hole therethrough;
said implement additionally comprising:
a handle, said handle comprising:
an elongated handle member;
a pivot fitting;
said pivot fitting having a bifurcated end with two outstanding tines and a space disposed therebetween;
said space being proportioned to accept and accommodate said pivot member;
each of said outstanding tines being provided with a hole therethrough;
a detachable threaded connection between said handle member and said pivot fitting;
a threaded bolt for passing through said hole in said pivot member and each of said holes in said outstanding tines;
a wing nut for threading onto said bolt; and
at least two washers.

6. An implement according to claim 5, wherein said handle member is wood.

* * * * *